US011615260B2

(12) United States Patent
Palacios et al.

(10) Patent No.: US 11,615,260 B2
(45) Date of Patent: Mar. 28, 2023

(54) SYSTEMS AND METHODS FOR ENFORCING CONSTRAINTS IN CHARACTER RECOGNITION

(71) Applicant: ELEMENT AI INC., Montreal (CA)

(72) Inventors: Hector Palacios, Montreal (CA); Pierre-Andre Noel, Montreal (CA)

(73) Assignee: SERVICENOW CANADA INC., Montreal (CA)

(*) Notice: Subject to any disclaimer, the term of this patent is extended or adjusted under 35 U.S.C. 154(b) by 359 days.

(21) Appl. No.: 17/037,101

(22) Filed: Sep. 29, 2020

(65) Prior Publication Data
US 2022/0101036 A1 Mar. 31, 2022

(51) Int. Cl.
G06K 9/62 (2022.01)
G06N 20/00 (2019.01)
G06V 30/10 (2022.01)

(52) U.S. Cl.
CPC ........... G06K 9/6201 (2013.01); G06K 9/628 (2013.01); G06N 20/00 (2019.01); G06V 30/10 (2022.01)

(58) Field of Classification Search
CPC ...... G06K 9/6201; G06N 20/00; G06N 7/005; G06V 30/10; G06V 10/84
See application file for complete search history.

(56) References Cited

U.S. PATENT DOCUMENTS

2017/0364831 A1 12/2017 Ghosh et al.
2018/0121807 A1 5/2018 Wick et al.
2018/0306459 A1 10/2018 Turney
2019/0340524 A1 11/2019 Kirchhoff et al.
2021/0073617 A1* 3/2021 Bazzani ............... G06K 9/6267

FOREIGN PATENT DOCUMENTS

CA 2963808 A1 10/2017
EP 3534284 A1 9/2019

OTHER PUBLICATIONS

International Search Report and Written Opinion with regard to PCT/IB2021/058951 dated Jan. 25, 2022.
Yang, W. et al., "Output-Constrained Bayesian Neural Networks", arXiv.org, v1, May 15, 2019, pp. 1-7.

(Continued)

Primary Examiner — King Y Poon
Assistant Examiner — Michael Burleson
(74) Attorney, Agent, or Firm — BCF LLP

(57) ABSTRACT

There is disclosed a method of and a system for predicting text in an image using one or more constraints. The image is input to a machine learning algorithm (MLA). The MLA outputs a probability distribution. The probability distribution comprises a predicted probability for each of a plurality of pairs, where each pair comprises a class and a next state of the MLA. The states of the probability distribution are added to a set of states to be searched. States that are end states or that fail to satisfy at least one of the constraints are removed from the set of states to be searched. States of the set of states to be searched are input to the MLA. The search is repeated with new states output by the MLA. End states output by the MLA are output as output states that each comprise a sequence of characters.

16 Claims, 7 Drawing Sheets

(56) References Cited

OTHER PUBLICATIONS

Arulkumaran, K. et al., "A Brief Survey of Deep Reinforcement Learning", arXiv.org, v2, Sep. 28, 2017, pp. 1-16.
Raghu, P.P. et al., "Supervised Texture Classification Using a Probabilistic Neural Network and Constraint Satisfaction Model", IEEE Transactions on Neural Networks, vol. 9, No. 3, May 31, 1998, pp. 516-522.
Chandrasekara, V. et al., "An Improved Probabilistic Neural Network Model for Directional Prediction of a Stock Market Index", Appl. Sci. 2019, 9(24), 5334; Dec. 6, 2019, pp. 1-21.
Lorenzi, M. et al., "Constraining the Dynamics of Deep Probabilistic Models", arXiv.org, v2, Jun. 18, 2018, pp. 1-13.
Scheidl, "Word Beam Search: A CTC Decoding Algorithm", Jul. 19, 2018, retrieved on https://towardsdatascience.com/word-beam-search-a-ctc-decoding-algorithm-b051d28f3d2e on Oct. 21, 2022, pdf 11 pages.
Anonymous authors, "(Unconstrained) Beam Search is Sensitive to Large Search Discrepancies", Under Review as a Conference Paper at ICRL 2019, pp. 1-18.
Strauss et al., "Regular expressions for decoding of neural networkoutputs", Neural networks: the official journal of the International Neural Network Society, vol. 79, 2016, pp. 1-25.
Office Action with regard to the counterpart CA Patent Application No. 3,094,683 dated Nov. 10, 2021.
Poole, D.L. et al., "Artificial Intelligence—Foundations of Computational Agents", Cambridge University Press, New fork, 1st Ed., Jan. 31, 2010, retrieved from https://www.researchgate.net/file.PostFileLoader.html?Id-5440e3bdd5a3f298288b45fe&assetKey-AS%3A273625985290242%401442248926315 on Nov. 2, 2021, 682 pages.

* cited by examiner

SYSTEMS AND METHODS FOR ENFORCING CONSTRAINTS IN CHARACTER RECOGNITION

FIELD

The present technology relates to systems and methods for applying constraints to machine learning algorithms (MLA). In particular, the present technology relates to systems and methods for generating predictions of text in an image using one or more MLAs, where the predictions satisfy constraints.

BACKGROUND

Machine learning techniques have proven to be useful for a variety of applications. Machine learning algorithms (MLAs) can be trained to make predictions based on a set of labelled training data. Rather than making predictions based on a set of instructions entered by a programmer, an MLA can be trained to make predictions based on previously recorded data that is labelled.

Because MLAs are not given a set of rules, but rather are trained, the MLAs can sometimes output predictions that to a human would obviously be wrong, or a set of predictions that are incompatible with each other. These erroneous predictions can cause users to lose trust in the MLA.

SUMMARY

Constraints may be defined and applied to an MLA in order to limit the predictions of the MLA to predictions that satisfy the constraints. Input may be provided to the MLA. The input may be in any format, such as an image, audio, data, etc. An initial MLA state may also be provided to the MLA. The MLA may output a probability distribution, containing probabilities for each class of a set of classes and a new internal state. The probability distribution may then be searched to determine additional MLA states to input to the MLA. A beam search may be used to select MLA states from the probability distribution to be input to the MLA. After the MLA outputs a probability distribution, MLA states and their associated classes that do not satisfy the constraints may be filtered out. Any MLA states that are end states may be stored, with associated data, in a set of output states. The output states may be returned with a score for each output state. The score may be a predicted probability of the output state.

According to a first broad aspect of the present technology, there is provided a method of predicting text in an image using one or more constraints. The method comprises: inputting, to a machine learning algorithm (MLA), the image and a first state of the MLA, wherein the MLA was trained to predict a probability distribution that the image corresponds to pairs, each pair comprising a class in a set of classes and a next state of the MLA, and wherein each class in the set of classes comprises one or more characters; outputting, by the MLA and based on the image and the first state, the probability distribution, wherein the probability distribution comprises a predicted probability for each pair of a plurality of pairs, each pair comprising a class in the set of classes and a corresponding state of the MLA; adding each state of the probability distribution to a set of states to be searched; applying a search to the set of states to be searched, wherein applying the search comprises: removing, from the set of states to be searched, any states that are end states, removing, from the set of states to be searched, any states that fail every constraint of the one or more constraints, selecting, to input to the MLA, one or more states of the set of states to be searched, inputting, to the MLA, each of the selected one or more states, thereby generating one or more additional probability distributions, adding, to the set of states to be searched, one or more states of the one or more additional probability distributions thereby generating an updated set of states to be searched, and repeating the search with the updated set of states to be searched; and outputting one or more output states selected by the search, wherein each of the one or more output states contains an end state and wherein each of the one or more output states comprises a sequence of characters satisfying at least one of the one or more constraints.

In some implementations of the method, the method further comprises, after selecting a state to input to the MLA, removing, from the set of states to be searched, the selected state. In some implementations of the method, the probability distribution is a partial probability distribution having a total probability mass that is less than one.

In some implementations of the method, the probability distribution is a partial probability distribution having a total probability mass that is less than one.

In some implementations of the method, the partial probability distribution comprises a table or a graphical model.

In some implementations of the method, a number of states to be searched before repeating the search is reduced to less than or equal to a pre-determined beam size.

In some implementations of the method, the updated set of states to be searched comprises highest-ranked states of the set of states to be searched.

In some implementations of the method, the method further comprises: determining that a first state key associated with a first state of the set of one or more states to be searched is equivalent to a second state key associated with a second state of the set of one or more states to be searched; and combining the first state and the second state.

In some implementations of the method, determining a predicted probability of the first state; determining a predicted probability of the second state; summing the predicted probability of the first state and the predicted probability of the second state; assigning the summed predicted probability to a combined state corresponding to the first state and the second state; and adding the combined state to the set of one or more states to be searched.

In some implementations of the method, the set of classes comprises an alphabet.

In some implementations of the method, each state in the probability distribution is associated with a candidate containing a string, and wherein the string comprises a sequence of classes that are part of the alphabet.

In some implementations of the method, a constraint of the one or more constraints comprises a finite-state automata.

In some implementations of the method, the constraint of the one or more constraints comprises a regular expression comprising the finite-state automata.

In some implementations of the method, a constraint of the one or more constraints comprises a transducer.

In some implementations of the method, the method further comprises: receiving, by the transducer, a first class corresponding to a first character; and outputting, by the transducer, a second class corresponding to a second character that is different from the first character.

In some implementations of the method, the transducer is a weighted finite-state transducer, and further comprising outputting, by the transducer, a score.

According to another broad aspect of the present technology, there is provided a system comprising at least one processor and memory. The memory stores a plurality of executable instructions. The plurality of executable instructions, when executed by the at least one processor, cause the system to: input, to a machine learning algorithm (MLA), an image and a first state of the MLA, wherein the MLA was trained to predict a probability distribution that an image corresponds to pairs, each pair comprising a class in a set of classes and a next state of the MLA, and wherein each class in the set of classes comprises one or more characters; output, by the MLA and based on the image and the first state, the probability distribution, wherein the probability distribution comprises a predicted probability for each pair of a plurality of pairs, each pair comprising a class in the set of classes and a corresponding state of the MLA; add each state of the probability distribution to a set of states to be searched; apply a search to the set of states to be searched, wherein applying the search comprises: removing, from the set of states to be searched, any states that are end states, removing, from the set of states to be searched, any states that fail every constraint of a set of one or more constraints, selecting, to input to the MLA, one or more states of the set of states to be searched, inputting, to the MLA, each of the selected one or more states, thereby generating one or more additional probability distributions, adding, to the set of states to be searched, one or more states of the one or more additional probability distributions thereby generating an updated set of states to be searched, and repeating the search with the updated set of states to be searched; and output one or more output states selected by the search, wherein each of the one or more output states contains an end state and wherein each of the one or more output states comprises a sequence of characters satisfying at least one constraint of the set of one or more constraints.

In some implementations of the system, the instructions further cause the system to: determine that a first state key associated with a first state of the set of one or more states to be searched is equivalent to a second state key associated with a second state of the set of one or more states to be searched; and combine the first state and the second state.

In some implementations of the system, the instructions further cause the system to: determine a predicted probability of the first state; determine a predicted probability of the second state; sum the predicted probability of the first state and the predicted probability of the second state; assign the summed predicted probability to a combined state corresponding to the first state and the second state; and add the combined state to the set of one or more states to be searched.

Various implementations of the present technology provide a non-transitory computer-readable medium storing program instructions for executing one or more methods described herein, the program instructions being executable by a processor of a computer-based system.

Various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
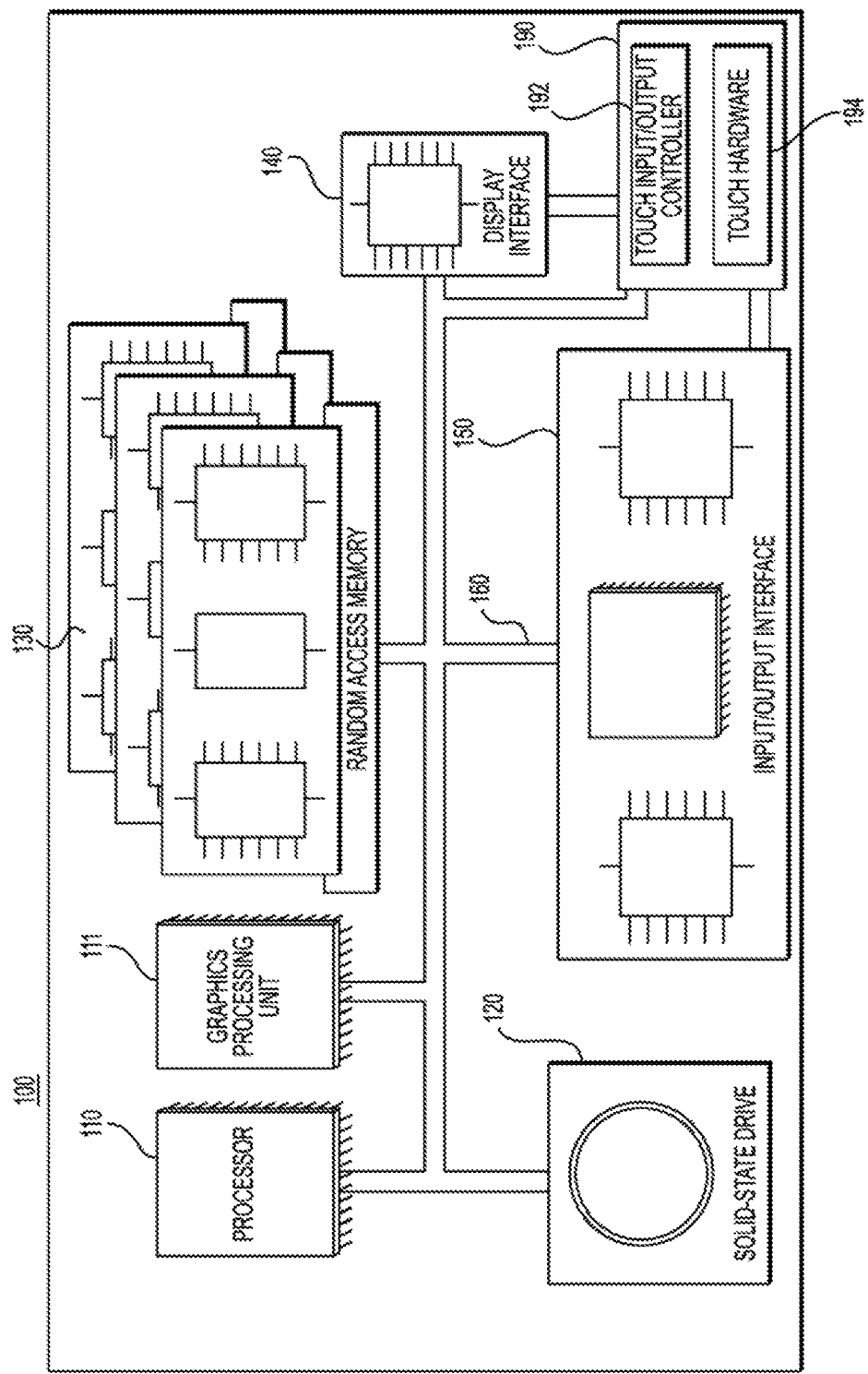
FIG. 1 is a block diagram of an example computing environment in accordance with various embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry and/or illustrative systems embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Some or all of the functions described herein may be performed by a cloud-based system. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof.

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Figure 2:
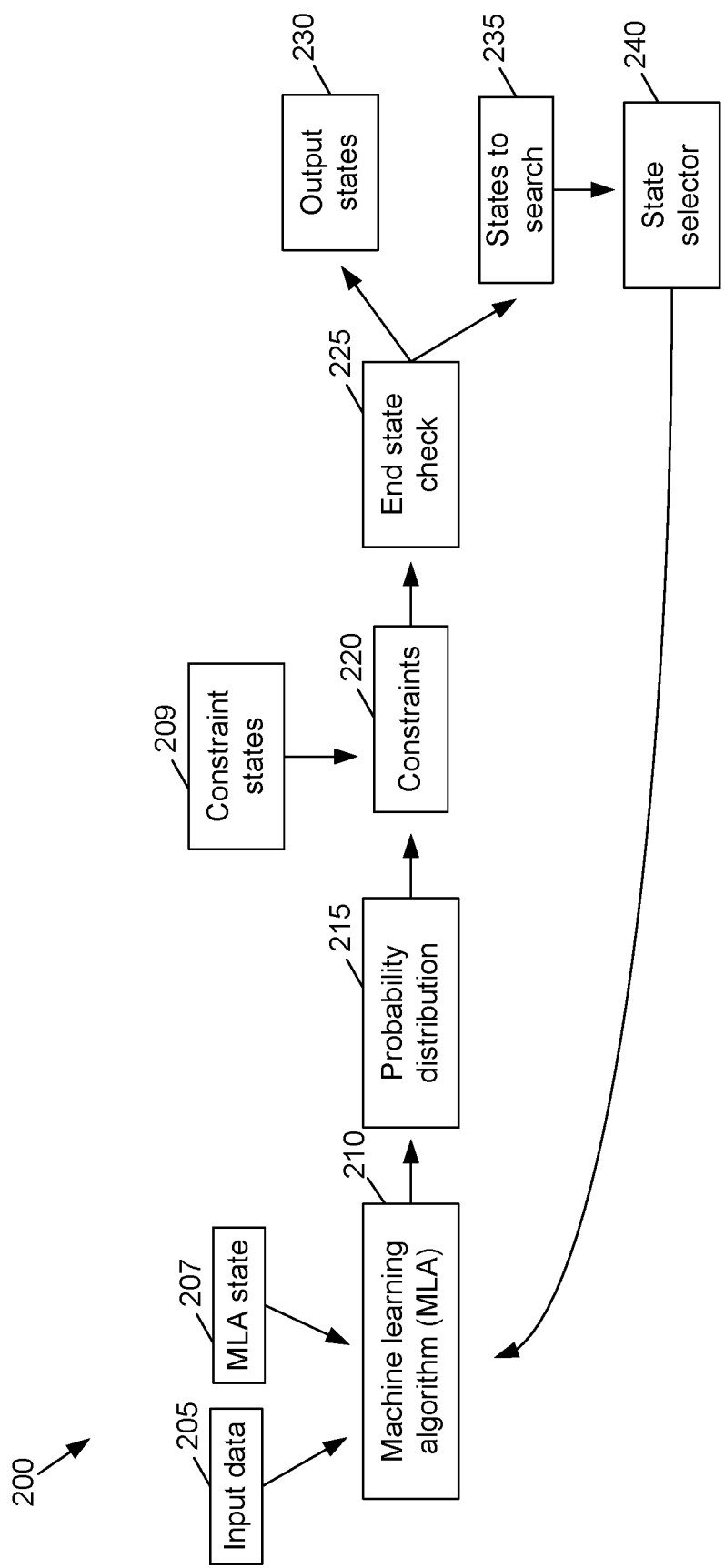
FIG. 2 is a diagram illustrating a system for applying constraints to a machine learning algorithm (MLA) in accordance with various embodiments of the present technology.

FIG. 2 is a diagram illustrating a system 200 for applying constraints to a machine learning algorithm (MLA) in accordance with various embodiments of the present technology. The system 200 may receive input and output predictions based on the received input.

The system 200 may receive input data 205. The input data 205 may be in any format suitable for the MLA 210. The input data 205 may be in the same format as the training data that was used to train the MLA 210. The input data may be audio, text, video, an image, a set of inputs, a sequence of inputs, and/or any combination thereof. The input data 205 may include any number of features.

Data pre-processing may be performed on the input data 205. Additional features may be generated based on the input data 205, the input data 205 may be normalized, outliers may be removed from the input data 205, the input data 205 may be transformed, and/or any other type of pre-processing may be performed on the input data 205.

The input data 205 may be input to the MLA 210. An MLA state 207 of the MLA 210 may be input to the MLA 210 along with the input data 205. If this is the first iteration of the system 200, the MLA state 207 may be an initial state.

The MLA 210 may have previously been trained using labelled training data. The MLA 210 may have been trained to receive the input data 205 and/or the state of the MLA 207, and then output predictions, such as in the form of a probability distribution 215. The MLA 210 may be used in a system without the constraints 220. The output of the system 200 (including the constraints 220) may be more accurate than the output of the MLA 210 alone without the constraints 220. The MLA 210 may have been previously used and/or trained in a system without the constraints 220.

The MLA 210 may be any type of MLA, such as a neural network, tree-based MLA, etc. Although illustrated as a single MLA 210, the MLA 210 may include more than one MLA and/or may be a combination of different types of MLA.

Figure 5:
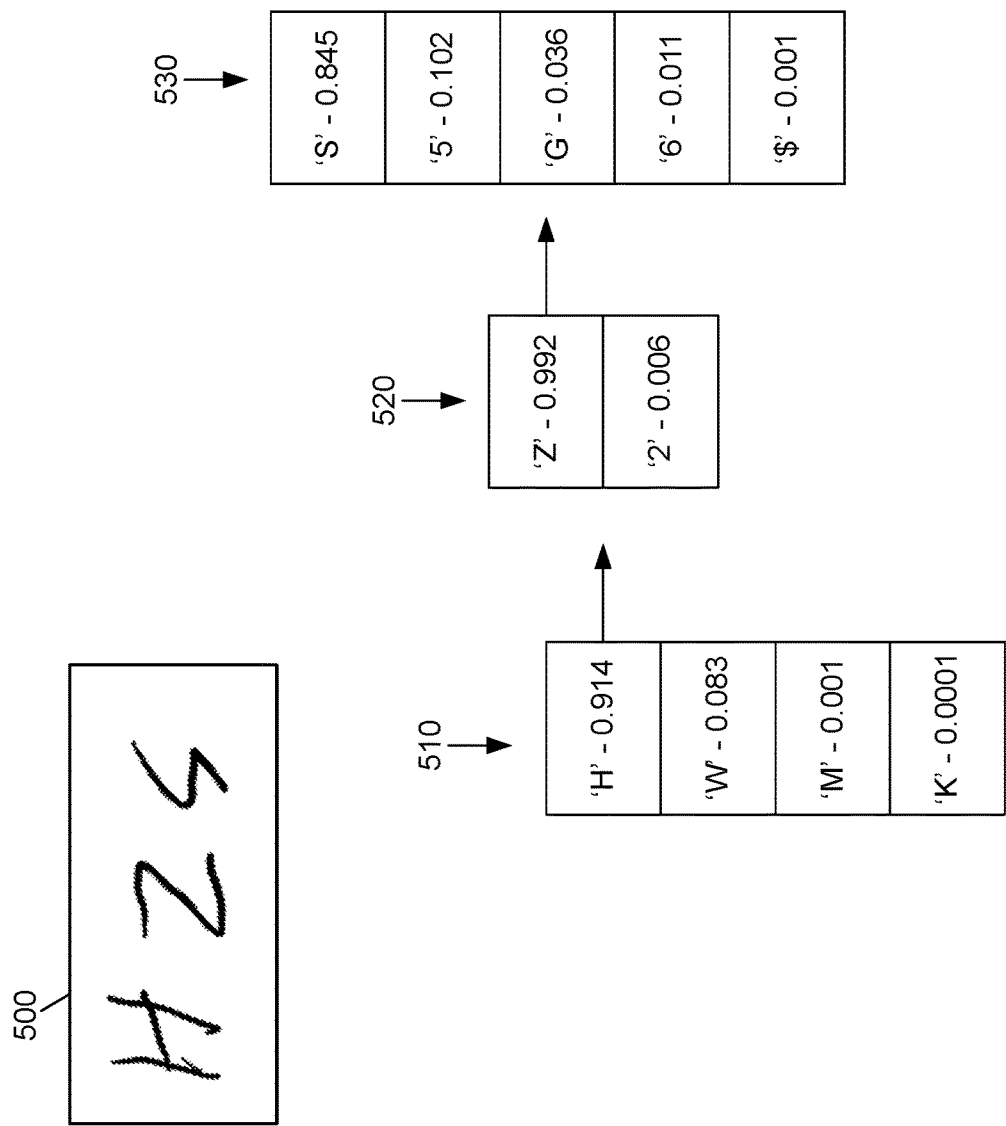
FIG. 5 is a diagram illustrating a probability distribution for optical character recognition in accordance with various embodiments of the present technology.

After processing the input data 205 and/or MLA state 207, the MLA 210 may output the probability distribution 215. The probability distribution 215 may include various classes, and, for each class, a predicted probability that the input data 205 corresponds to that class. The probability distribution 215 may, for each class, include a new MLA state corresponding to that class. The probability distribution may indicate a score for each paired MLA state and class. The score may be a probability. For example if the MLA 210 were trained to receive an image and recognize text in the image, the probability distribution 215 may include, for each letter of the alphabet, a probability for that letter and a new MLA state for that letter. FIG. 5, described in further detail below, illustrates several examples of a probability distribution 215.

The probability distribution 215 may be a set of MLA outputs, where each of the MLA outputs includes an MLA state, a class, and a score. The set of MLA outputs may form the probability distribution 215. The probability distribution 215 may be in any suitable format, such as a table or graphical model. The probability distribution 215 may be stored as a tree or as a graph. The probability distribution 215 may be a partial distribution, in which the sum of the all of the probabilities (i.e. the total probability mass) of the distribution does not add up to one.

Constraints 220 may be applied to each class in the probability distribution 215. One or more constraint states 209 may be input to the constraints 220 with each class. If this is the first iteration of the system 200, the constraint states 209 may be the initial states of the constraints 220. In subsequent iterations, the constraint states 209 may have been output by the constraints 220. A constraint state 209 may indicate which portion of the constraint 220 to apply to the class. For example, if a constraint 220 indicates that a sequence of characters must begin with the characters 'abc', the initial constraint state 209 may indicate that the initial class in the sequence must be the character 'a'. If 'a' has been observed and that portion of the constraint 220 is satisfied, the new constraint state 209 may indicate that the next class that can satisfy the constraint 220 is the character 'b'.

The constraints 220 may be in any format, such as a finite state automata, a regular expression (regex), a transducer, a logical statement, and/or any other suitable format for a constraint. The constraints 220 may be defined by an operator of the system 200. Each of the constraints 220 may be configured to receive a class in the probability distribution 215 as input and/or a constraint state 220. Each of the constraints 220 may output a constraint state, a class, and/or a score. The constraint state may indicate whether the input class satisfied the constraint. The constraint state may indicate whether the input class is an invalid input. The output class may be the same as the input class or may be different.

Some or all of the classes in the probability distribution 215 may be input to the constraints 220. For each class in the probability distribution 215 that is input to the constraints 220, a set of constraint states may be generated for that class. The set of constraint states may include one constraint state for each of the constraints 220.

The constraints 220 may prevent the system 200 from outputting output states 230 that are impossible. For example if the MLA 210 is trained to receive a picture of a person and then output the age of that person, the constraints 220 may limit the possible ages that can be output to less than one hundred and thirty years old, as nobody has ever lived to be above that age. But if the MLA 210 was trained to receive a picture of a giant tortoise and predict an age of the tortoise, the constraint may be set to a higher age as giant tortoises can live longer than one hundred and thirty years. The system 200 may be configured to produce output states 230 that each satisfy at least one of the constraints 220. In some instances the system 200 may be configured to produce output states 230 that each satisfy every one of the constraints 220.

An end state check 225 may determine whether any of the MLA states in the probability distribution 215 are end states. Any states that are determined to be end states may be stored in a set of output states 230. If a state is placed in the output states 230, a score, such as a probability, may be determined for the state from the probability distribution 215 and stored with the state in the set of output states 230. As will be discussed in further detail below, each output state in the output states 230 may include an MLA state, constraint states, candidates, and/or scores. States that are not end states may be stored in the set of states to search 235.

A set of states to search 235 may be generated from the probability distribution 215. The set of states to search 235 may contain a set of state data. Each state data may contain an MLA state, one or more constraint states, one or more candidates, and/or one or more scores. Each state data stored in the set of states to search 235 may have originated as an MLA output that satisfied at least one of the constraints 220 and was found not to be an end state by the end state check 225.

The set of states to search 235 may be processed by a state selector 240. At each iteration of the system 200, the state selector 240 may select all or a portion of the state data in the states to search 235 to input to the MLA 210. For the next iteration of the system 200, each of the selected state data may be input to the MLA 210.

The state selector 240 may incorporate any suitable type of search algorithm and/or search methodology. The state selector 240 may select states based on a heuristic search algorithm, such as a beam search or a branch-and-bound search. The amount of states input by the state selector 240 to the MLA 210 at each iteration of the system 200 may be a predetermined beam size.

In some instances, the states input to the MLA 210 may be a subset of the states to search 235. Each state data in the subset may be input individually to the MLA 210, in other words a single state data may be input to the MLA 210 at a time. The state data in the states to search 235 may be ranked, such as based on predicted probability. A state score associated with each state data may be used to rank the state data in the states to search 235. A number of higher-ranked state data, such as the ten state data having the highest predicted probability, may be selected by the state selector 240 to be input to the MLA 210. Lower-ranked state data in the states to search 235 might not be input to the MLA 210.

At each iteration of the system 200, the state data that are not selected to be input to the MLA 210 may be removed from the states to search 235. The states to search 235 may be reduced to the pre-determined beam size of the beam search by removing lowest-ranked state data.

The system 200 may continue to input state data to the MLA 210 and generate probability distributions 215 until the set of states to search 235 is empty and/or any other end condition is reached. End conditions may include a timeout, a pre-determined number of output states being reached, and/or be based on a probability that the best solution has been found. All or a portion of the output states 230 may then be output. Each of the output states 230 may have an associated score, such as a predicted probability. Each of the state data in the output states 230 may satisfy at least one of the constraints 220. Each of the state data in the output states 230 may contain an end state.

Figure 3:
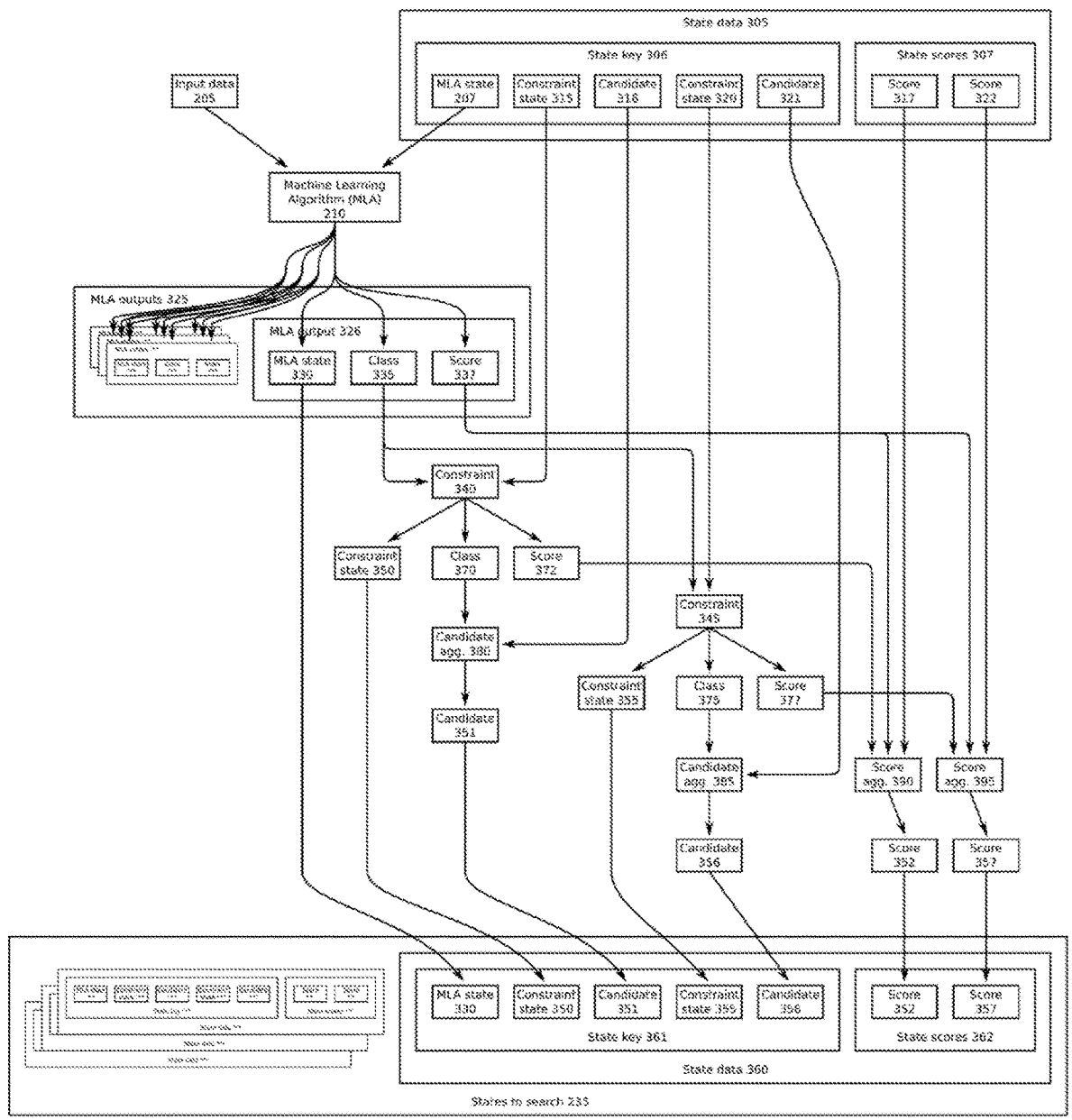
FIG. 3 is a diagram illustrating the search illustrated in FIG. 2 in accordance with various embodiments of the present technology.

FIG. 3 is a diagram illustrating an iteration of the search illustrated in FIG. 2 in accordance with various embodiments of the present technology. As illustrated in FIG. 2, input data 205 is input to an MLA 210. The input data 205 may be an image, audio, video, and/or any other type of data.

An MLA state 207 may be input to the MLA 210. The MLA state 207 may be associated with, or a part of, state data 305. The state data 305 may include a state key 306 and/or state scores 307. The state key 306 may include the MLA state 207, a constraint state 315, a candidate 316, a constraint state 320, and a candidate 321. Although two constraint states 315 and 320 are illustrated, the state data 305 may contain any number of constraint states. The constraint state 315 and constraint state 320 may each have been output by a constraint, such as the constraints 340 and 345. The amount of constraint states may match the amount of constraints being applied. The MLA state 207 may be a state that was previously output by the MLA 210. For a first iteration of the search, the MLA state 207, the constraint state 315, and/or the constraint state 320 may be empty states and/or initial states.

The MLA 210 may receive the input data 205 and MLA state 207 and generate a set of MLA outputs 325 containing one or more MLA outputs 326. In some instances the MLA 210 might not output any MLA output 326. The MLA output 326 may contain an MLA state 330, a class 335, and/or a score 337. The class 335 may be an index corresponding to the class. As discussed with regard to FIG. 2, the MLA 210 may output a probability distribution having multiple paired MLA states and classes. The probability distribution may be contained in the set of MLA outputs 325. For each MLA state 207 input to the MLA 210, a set of MLA outputs 325 may be output. At each iteration of the system illustrated in FIG. 3, MLA outputs 326 may be output one-by-one and/or simultaneously by the MLA 210. Each MLA output 326 in the set of MLA outputs 325 may correspond to an individual MLA state 207 that was input to the MLA 210. The score 337 may be a probability associated with the MLA state 330 and/or any other score associated with the MLA state 330.

Constraints 340 and 345 may check all or a portion of the MLA output 326. Although two constraints 340 and 345 are illustrated, any number of constraints may be used. The constraint 340 may receive the class 335 and the constraint state 315. The constraint 345 may receive the class 335 and the constraint state 320. The constraint 340 and the constraint 345 may check the class 335 to see whether it satisfies each constraint. The constraint 340 may output a constraint state 350, a class 370, and/or a score 372. The constraint state 350 may indicate a new state of the constraint 340 after the constraint 340 has checked the class 335 using the constraint state 315. The constraint state 350 may indicate whether or not the class 335 satisfied the constraint 340 given the constraint state 315. The constraint state 350 may indicate whether the class 335 is an invalid input given the constraint state 315. The constraint state 350 may indicate a next expected input for the constraint 340. Like the constraint 340, the constraint 345 may output a constraint state 355, a class 375, and/or a score 377.

The class 370 may be the same as the class 335, or may be different. If the constraint 340 is a transducer, the class 335 and the class 370 may be different. For example if text recognition is being performed and case does not matter, if the class 335 indicates an upper case 'A' the constraint 340 may process the class 335 and output the class 370 corresponding to a lower case 'a'. Like the class 370, the class 375 may be the same as or different from the class 335.

A candidate aggregator 380 may receive the class 370 and the candidate 316, and then output a candidate 351. Similarly, for the constraint 345, a candidate aggregator 385 may receive the class 375 and candidate 321 and output a candidate 356. The candidate aggregator 380 may aggregate the class 370 and the candidate 316 to form the candidate 351. For example if the candidate aggregator 380 receives the string 'anim' as the candidate 316 and the character 'a' as the class 370, the candidate aggregator may output the string 'anima' as the candidate 351. Similarly, the candidate aggregator 385 may receive the class 375 and the candidate 321 and output the candidate 356.

The candidate aggregators 380 and 385 may be configured based on the type of class output by the MLA 210. As described above, if the classes are characters, the candidate aggregator 380 may append the character to the text in the candidate 316.

The score 372 may be assigned by the constraint 340. The score 372 may be a probability, a weight, and/or any other type of score. For example if the constraint 340 is a weighted transducer, the score 372 may be a weight. In this example, to determine a probability associated with the MLA state 330, the score 337 may be multiplied by the score 372. In some instances it may be advantageous to increase or decrease the probability associated with the MLA state 330. For example if the MLA 210 is predicting a sequence of text the system may be biased towards words that exist in a dictionary by providing a higher score 372 for a candidate 351 that exists in the dictionary. Similarly, a higher score 372 may be given if the candidate 351 is likely given a language model obtained from a pre-trained machine learning algorithm or any other source. By weighting the constraint 340 and/or 345 towards words that exist in a dictionary or is determined to have a high predicted likelihood based on a language model, the output states and/or predicted text would be more likely to exist in the dictionary or language model.

The score 372, score 337, and/or score 317 may be input to a score aggregator 390. Similarly, the score 377, score 337, and/or score 322 may be input to a score aggregator 395. The score aggregator 390 may aggregate the score 372, score 337, and/or score 317 to generate a score 352. The score aggregator 395 may aggregate the score 377, score 337, and/or score 322 to generate a score 357. Any suitable formula may be used by the score aggregator 390 and score aggregator 395. For example the score aggregator 390 may sum the score 372, score 337, and score 317. In another example the score aggregator 390 may multiply the score 372, score 337, and score 317.

State data 360 corresponding to the MLA state 330 may be formed. The state data 360 may contain a state key 361 and/or state scores 362. The state key 361 may contain the MLA state 330, constraint state 350, candidate 351, constraint state 355, and/or candidate 356. As can be seen, the state data 360 contains a set of data matching the types of data in the state data 305. The state data 360, if selected, can then be processed using the system illustrated in FIG. 3. In other words, if selected, such as by the state selector 240, the state data 305 would be replaced by the state data 360 and the MLA state 330 would be input to the MLA 210.

For each individual state data 305 that is input to the system illustrated in FIG. 3, any number of state data 360 may be output. In some instances no state data 360 may be output. When multiple state data 305 are input, a set of states to search 235 is generated, where the set of states to search 235 contains multiple state data 360. Some of the state data 360 may be removed from the set of states to search 235. If the constraint state 351 indicates that the class 335 failed to satisfy constraint 340 and the constraint state 355 indicates that the class 335 also failed to satisfy the constraint 345, the state data 360 may be removed from the states to search 235. If either of the constraint states 350 or 355 indicate that the class 335 was invalid, the state data 360 may be removed from the set of states to search 235.

State data 360 in the states to search 235 may be ranked, such as based on the state scores 362. During each iteration of the search, a pre-determined number of highest-ranked state data 360 may be selected from the states to search 235. The other state data 360 may be removed from the states to search 235. For example if a beam size of the search is set to ten, the ten highest-ranked state data 360 may be selected at each iteration. The MLA state 330 of each of those ten highest-ranked state data 360 may be individually input to the MLA 210 during the next iteration.

Two or more of the state data 360 in the states to search 235 may be merged. For example, if two state data 360 have identical state keys 361, the two state data 360 may be merged into a merged state. The two state data 360 that were merged may be removed from the states to search 235 and replaced with a single merged state data 360. A score for the merged state data 360 may be determined by summing the state scores 362 of the two states that were merged, and/or by any other suitable operation such as determining an average of the state scores 362 of the two states. Any number of state data 360 may be merged. For example if five state data 360 in the set of states to search 235 have identical state keys 361, the five state data 360 may be merged into a single merged state data 360. State data 360 may be merged based on the state key 361 and/or based on any other suitable criteria. In some instances, state data 360 may have multiple state keys 361.

Figure 4:
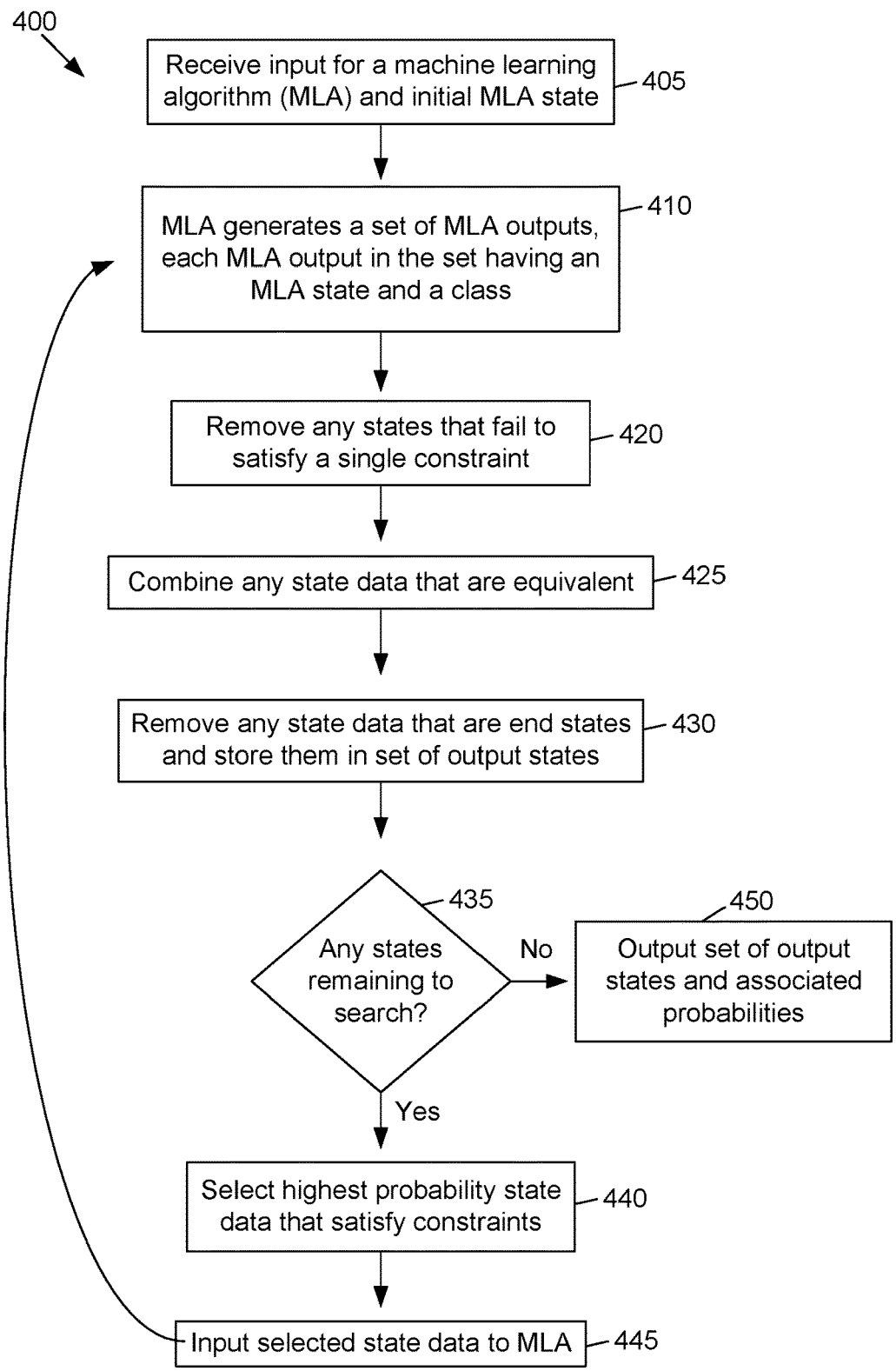
FIG. 4 is a flow diagram of a method for determining predicted states that satisfy constraints in accordance with various embodiments of the present technology.

FIG. 4 is a flow diagram of a method 400 for determining predicted states that satisfy constraints in accordance with various embodiments of the present technology. In one or more aspects, the method 400 or one or more steps thereof may be performed by a computing system, such as the computing environment 100. The method 400 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order At step 405 input may be received for an MLA, such as the input data 205. The input may be in any suitable format for the MLA. The input may be in the same format as the training data used to train the MLA. The input data may be an image, audio, video, text, and/or any other type of data or combination of types of data. An initial state of the MLA may be received and/or generated. The initial state of the MLA may be an empty state and/or a default state.

At step 410 the MLA, such as the MLA 210, may generate a set of MLA outputs based on the input. Each MLA output in the set may include an MLA state, a class, and/or a score. Although described as a single MLA, any number of MLAs may be used to generate the MLA outputs. The MLA or MLAs may be any type of MLA and/or combination of types of MLAs. For example the MLA may be a neural network. The MLA outputs may be stored in a set of states to search.

At step 420 each MLA output may be checked by one or more constraints. If the MLA output satisfies at least one of the constraints, the state data for that MLA output may be kept in the set of states to search. Otherwise, if the MLA output fails to satisfy every one of the constraints, the state data for that MLA output may be removed from the set of states to search. To determine whether an MLA output satisfies a constraint, the constraint may check the class in the MLA output using the constraint state in the input state data that was used to generate the MLA output (as can be seen in FIG. 3). After step 420, each state data in the set of states to search may satisfy at least one of the constraints.

At step 425 state data that are equivalent may be combined. One or more transducers may be used to determine whether two state data are equivalent. Predefined rules may be used to determine whether state data are equivalent. For example if the candidate in the state data is a sequence of text, spaces may be removed from each of the sequences and the candidates may then be compared. If two state data contain the same candidate after the spaces have been removed, those two state data may be combined. In another example, a transducer may be configured to ignore the case of text. In that example, a first state data containing the string 'aa' as a candidate may be combined with a second state data containing the string 'AA' as a candidate. The state keys of two state data may be compared. If the state keys of the two state data are identical, the two state data may be merged into a single state data. The state scores of each of the state data may be summed to form the state scores of the merged state data. Any state data that were used to form a merged state data may be removed from the set of states to search.

At step 430 any state data containing end states may be removed from the set of states to search. An end state check module, such as the end state check 225, may be called to determine whether a state data contains an end state. The end state check module may check the MLA state and/or constraint states in the state data to determine whether the state data contains an end state. Any state data containing an end state may be removed from the set of states to search and/or stored in a set of output states.

At step 435 a determination may be made as to whether there are any state data remaining in the set of states to search. If there is at least one state data remaining, the method 400 may continue from step 435 to step 440.

At step 440 one or more state data may be selected to search. The state data in the set of states to search may be ranked by any ranking method, such as based on the scores in each state data. The state data may be ranked based on predicted probability, which may be stored in the scores. If the state data are ranked based on predicted probability, the highest-ranked state data will be state data having the highest predicted probability. A pre-determined amount of highest-ranked state data may be selected, such as the ten highest-ranked state data. If the search being performed is a beam search, the amount of state data to be selected may be referred to as the "beam size" of the search. State data that are not selected may be removed from the set of states to search.

At step 445 the selected state may each be input individually to the MLA. The selected state data may each be input separately. The input received at step 405 may also be input with each state data. For each state data input to the MLA, the MLA may output an MLA output at step 410. The MLA output may then be filtered at steps 420-30, and searched at steps 435-45.

The method 400 may continue searching state data until there are no longer any state data to search in the set of states to search, such as because there are no remaining state data that satisfy at least one of the constraints and/or there are no remaining state data that do not contain end states. If, at step 435, a determination is made that there are no remaining state data to search, the method 400 may terminate at step 450.

At step 450 the output states may be output. Each output state may contain a state data. All or a portion of the output states may be output. For example the candidates and/or scores of the state data in the output states may be output. The output states may be ranked, such as using the same ranking methodology used at step 440. A predetermined amount of highest-ranked output states may be output at step 450. A predicted probability associated with each of the output states may be output at step 450. The predicted probability for each output state may be determined based on the state scores in the output state.

FIG. 5 is a diagram illustrating a probability distribution for optical character recognition in accordance with various embodiments of the present technology. Image 500 is an example of an image that may be received for optical character recognition. The exemplary image 500 includes the text 'H2S'. The image 500 is the first three digits of a Canadian postal code. The first three digits of all Canadian postal codes are composed of a letter, followed by a number, followed by a letter.

The image 500 may be input to an MLA, such as the MLA 210. The MLA may first output a probability distribution 510, which indicates a predicted probability for each paired MLA state and class. The probability distribution may be a set of MLA outputs, such as the set of MLA outputs 325. The predicted probability may be stored in a score, such as the score 337, associated with the MLA state and class.

The probability distribution 510 is a partial distribution, as the sum of the predicted probabilities does not sum to one. Rather than including a predicted probability for each of the classes, the probability distribution 510 includes the four classes having a highest predicted probability. The partial distribution may include a predetermined amount of classes. The partial distribution may include all classes satisfying a threshold predicted probability. For the image 500, the exemplary probability distribution 510 indicates that the classes with the highest predicted probability are 'H', 'W', 'M', and 'K', with the class 'H' having the highest predicted probability.

One or more of the MLA states in the probability distribution 510 may then be input to the MLA. In the example illustrated in FIG. 5, the MLA state associated with the class 'H' is input to the MLA. The MLA then outputs a probability distribution 520. In the probability distribution 520, the classes with the highest probability are 'Z' and '2'. The MLA state corresponding to the character 'Z' may then be input to the MLA, and the MLA may output the probability distribution 530. In the probability distribution 530, the classes with the highest probability are 'S', '5', 'G', '6', and '$'. Each MLA state illustrated in the probability distributions 510, 520, and 530 may be associated with a state data 360. Each of the illustrated MLA states may be linked to the entire sequence corresponding to that MLA state such as through the candidates contained in that state data, such as the candidate 351 and candidate 356. For example a candidate in the state data corresponding to the class 'S' in the probability distribution 530 may contain the sequence 'HZS'.

To determine the predicted probability of a candidate, such as the candidate associated with the class G' in the probability distribution 530, each of the probabilities corresponding to that class and the prior classes can be multiplied. For example, in FIG. 5, the predicted probability of the state 'HZG' is approximately 0.033.

Figure 6:
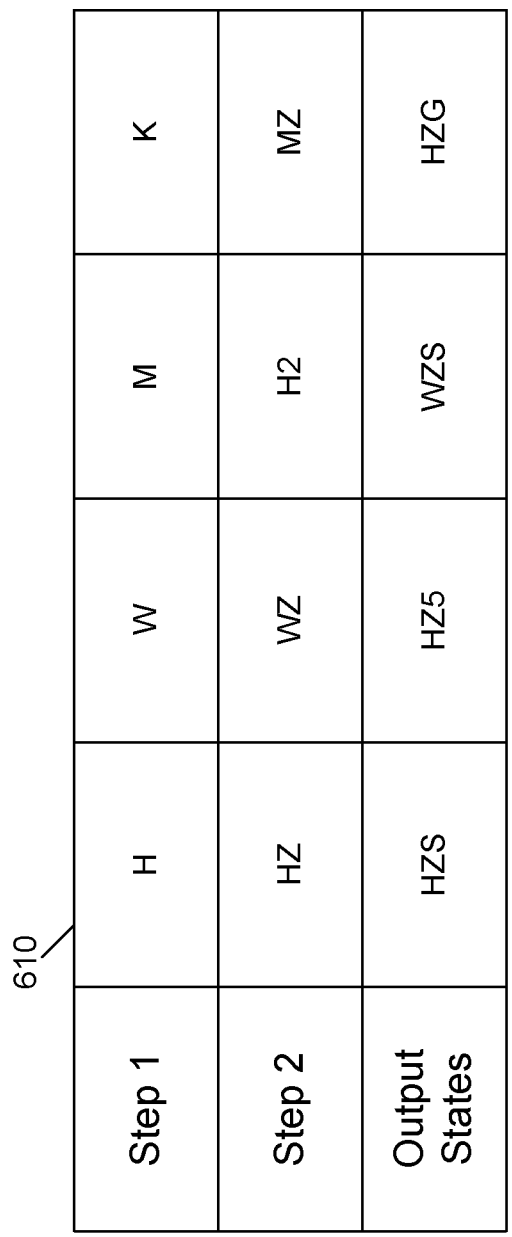
FIG. 6 is a diagram of results of a search of the probability distribution of FIG. 5 in accordance with various embodiments of the present technology.

FIG. 6 is a diagram 610 of results of a search of the probability distribution of FIG. 5 in accordance with various embodiments of the present technology. The diagram 610 illustrates the results of a beam search with a beam size of four. At each step, or iteration, of the beam search, four state data are selected to be input to the MLA. The results in the diagram 610 are obtained without applying any constraints to the beam search.

At the first step of the search, the state data containing the candidates 'H', 'W', 'M', and 'K' are selected. As can be seen in the probability distribution 510, those are the four initial state data having the highest predicted probabilities. The MLA states in each of these state data may then be input to the MLA, and four additional probability distributions (or four sets of MLA outputs 325) may be generated. A second set of states to search may then be searched.

At the second step of the search, next-states of the initial MLA states would be determined. For each of the next-states, a predicted probability would be determined by multiplying the predicted probability of the initial MLA state and the predicted probability of the next-state. The state data having the highest predicted probability at the second step of the search contain the candidates 'HZ', 'WZ', 'H2', and 'MZ'. Because the beam size of the search is four, four state data are selected at step two of the search. The four MLA states in these state data may then be input to the MLA and four additional probability distributions may be output by the MLA.

The MLA states output by the MLA after step two of the search may all be end-states. Or further iterations (not illustrated) of the search may occur. The state data containing the end-states may be ranked, such as based on predicted probability. The highest-ranked state data may be output as output states. The candidates in the four output states having the highest predicted probability are 'HZS', 'HZ5', 'WZS', and 'HZG'. The number of output states may be greater than the beam size of the search, for example all end-states that are found by the search may be output. Each of the output states may include an associated predicted probability, which may be determined based on the state scores associated with the output state.

The four state data identified at step three all contain final states, so the output of the beam search would be the four state data identified at step three. Because not all possible MLA states were searched, it is possible that these state data would not contain the four highest probability candidates if all MLA states were searched. By limiting the number of MLA states that were searched, the amount of time and/or resources consumed by the search is reduced.

None of the candidates output in the example in FIG. 6 correctly identify the text of the image 500, which is 'H2S'. None of the candidates output in the example in FIG. 6 could be the first three characters of a Canadian postal code, as none follows the format of letter-number-letter.

Figure 7:
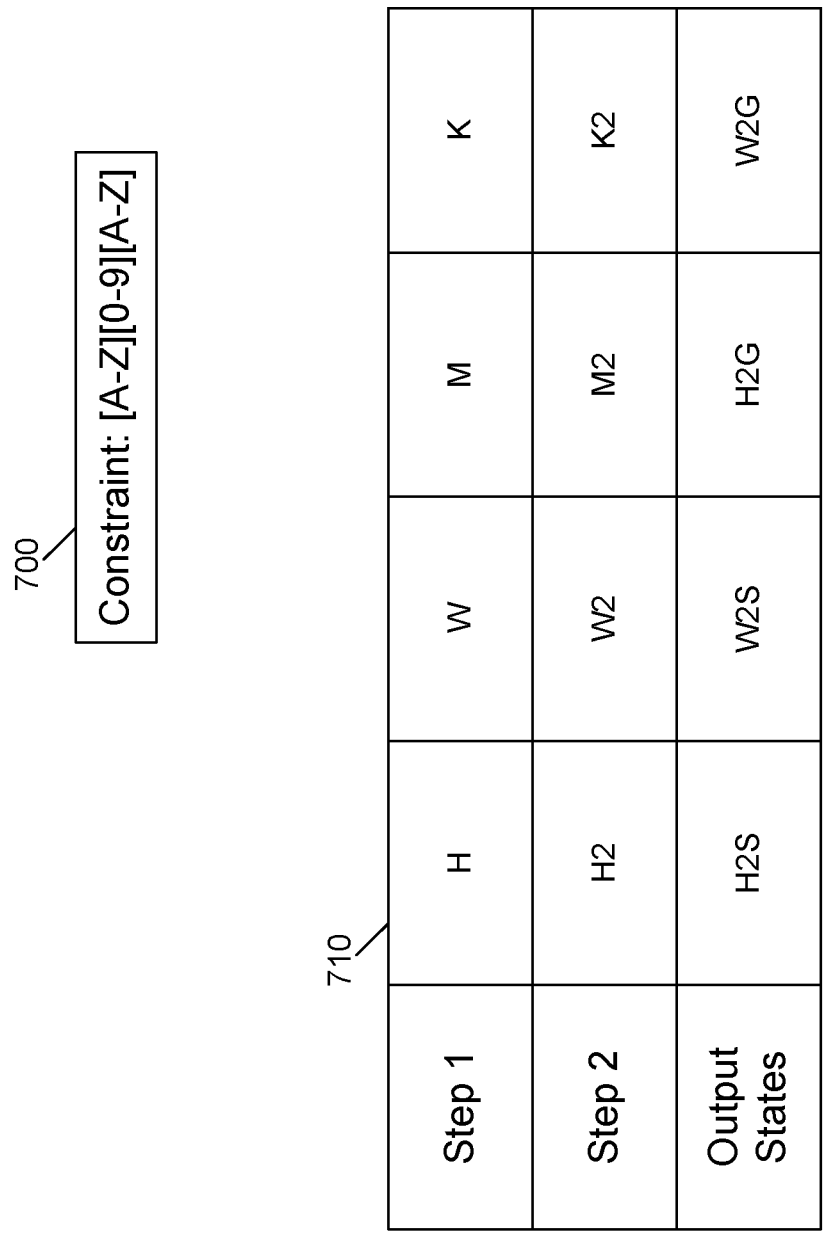
FIG. 7 is a diagram of results of a search with constraints of the probability distribution of FIG. 5 in accordance with various embodiments of the present technology.

FIG. 7 is a diagram 710 of results of a search with constraints 700 of the probability distributions of FIG. 5 in accordance with various embodiments of the present technology. The constraint 700 corresponds to the first three characters of a Canadian postal code. The constraint 700 indicates that output MLA states should include an uppercase letter, followed by a numeral, followed by another uppercase letter. The diagram 710 illustrates the results of a beam search incorporating the constraint 700, where the beam size four.

At the first step, or first iteration, of the search, the four state data having the highest predicted probability is the same as those in the diagram 610. Each of the candidates associated with the state data selected at step one begins with an uppercase letter, which satisfies the constraint 700.

At the second step of the search, the selected state data are different from the state data selected at step two in FIG. 6. The state data containing the candidates 'H2', 'W2', 'M2', and 'K2' are selected at step two. Each of these state data satisfies the constraint 700. Although these state data are not the next-states of the state data selected at step one that have the highest predicted probability (those are illustrated in FIG. 6), each of these state data satisfies the constraint 700. In the state data selected at step two of FIG. 6, only one of the state data would satisfy the constraint and possibly form the first two characters of a Canadian postal code.

The output states illustrated in FIG. 7, which are all final states, include the candidates 'H2S', 'W2S', 'H2G', and 'W2G'. The output state having the highest predicted probability contains the candidate 'H2S', which correctly predicts the text in the image 500. Without implementing the constraint, the output state having the highest predicted probability would contain the candidate 'HZS', as illustrated in FIG. 6. By using a constraint in the beam search, the beam search was able to correctly predict the text in the image 500. Without the constraint, the correct text was not included in any of the output states of the beam search, as illustrated in FIG. 6.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A method of predicting text in an image using one or more constraints, the method comprising:
inputting, to a machine learning algorithm (MLA), the image and a first state of the MLA, wherein the MLA was trained to predict a probability distribution that the image corresponds to pairs, each pair comprising a class in a set of classes and a next state of the MLA, and wherein each class in the set of classes comprises one or more characters;
outputting, by the MLA and based on the image and the first state, the probability distribution, wherein the probability distribution comprises a predicted probability for each pair of a plurality of pairs, each pair comprising a class in the set of classes and a corresponding state of the MLA;
adding each state of the probability distribution to a set of states to be searched;

applying a search to the set of states to be searched, wherein applying the search comprises:
removing, from the set of states to be searched, any states that are end states,
removing, from the set of states to be searched, any states that fail every constraint of the one or more constraints,
selecting, to input to the MLA, one or more states of the set of states to be searched,
inputting, to the MLA, each of the selected one or more states, thereby generating one or more additional probability distributions,
adding, to the set of states to be searched, one or more states of the one or more additional probability distributions thereby generating an updated set of states to be searched, and
repeating the search with the updated set of states to be searched; and
outputting one or more output states selected by the search, wherein each of the one or more output states contains an end state and wherein each of the one or more output states comprises a sequence of characters satisfying at least one of the one or more constraints.

2. The method of claim 1, further comprising, after selecting a state to input to the MLA, removing, from the set of states to be searched, the selected state.

3. The method of claim 1, wherein the probability distribution is a partial probability distribution having a total probability mass that is less than one.

4. The method of claim 3, wherein the partial probability distribution comprises a table or a graphical model.

5. The method of claim 1, wherein a number of states to be searched before repeating the search is reduced to less than or equal to a pre-determined beam size.

6. The method of claim 5, wherein the updated set of states to be searched comprises highest-ranked states of the set of states to be searched.

7. The method of claim 1, further comprising:
determining that a first state key associated with a first state of the set of one or more states to be searched is equivalent to a second state key associated with a second state of the set of one or more states to be searched; and
combining the first state and the second state.

8. The method of claim 7, wherein combining the first state and the second state comprises:
determining a predicted probability of the first state;
determining a predicted probability of the second state;
summing the predicted probability of the first state and the predicted probability of the second state;
assigning the summed predicted probability to a combined state corresponding to the first state and the second state; and
adding the combined state to the set of one or more states to be searched.

9. The method of claim 1, wherein the set of classes comprises an alphabet.

10. The method of claim 9, wherein each state in the probability distribution is associated with a candidate containing a string, and wherein the string comprises a sequence of classes that are part of the alphabet.

11. The method of claim 1, wherein a constraint of the one or more constraints comprises a finite-state automata.

12. The method of claim 11, wherein the constraint of the one or more constraints comprises a regular expression comprising the finite-state automata.

13. The method of claim 1, wherein a constraint of the one or more constraints comprises a transducer.

14. The method of claim 13, further comprising:
receiving, by the transducer, a first class corresponding to a first character; and
outputting, by the transducer, a second class corresponding to a second character that is different from the first character.

15. The method of claim 13, wherein the transducer is a weighted finite-state transducer, and further comprising outputting, by the transducer, a score.

16. A system comprising:
at least one processor, and
memory storing a plurality of executable instructions which, when executed by the at least one processor, cause the system to:
input, to a machine learning algorithm (MLA), an image and a first state of the MLA, wherein the MLA was trained to predict a probability distribution that an image corresponds to pairs, each pair comprising a class in a set of classes and a next state of the MLA, and wherein each class in the set of classes comprises one or more characters;
output, by the MLA and based on the image and the first state, the probability distribution, wherein the probability distribution comprises a predicted probability for each pair of a plurality of pairs, each pair comprising a class in the set of classes and a corresponding state of the MLA;
add each state of the probability distribution to a set of states to be searched;
apply a search to the set of states to be searched, wherein applying the search comprises:
removing, from the set of states to be searched, any states that are end states,
removing, from the set of states to be searched, any states that fail every constraint of a set of one or more constraints,
selecting, to input to the MLA, one or more states of the set of states to be searched,
inputting, to the MLA, each of the selected one or more states, thereby generating one or more additional probability distributions,
adding, to the set of states to be searched, one or more states of the one or more additional probability distributions thereby generating an updated set of states to be searched, and
repeating the search with the updated set of states to be searched; and
output one or more output states selected by the search, wherein each of the one or more output states contains an end state and wherein each of the one or more output states comprises a sequence of characters satisfying at least one constraint of the set of one or more constraints.

* * * * *